E. J. BRANDT.
COIN DELIVERY MACHINE.
APPLICATION FILED MAR. 26, 1904.

No. 923,013. Patented May 25, 1909.

6 SHEETS—SHEET 1.

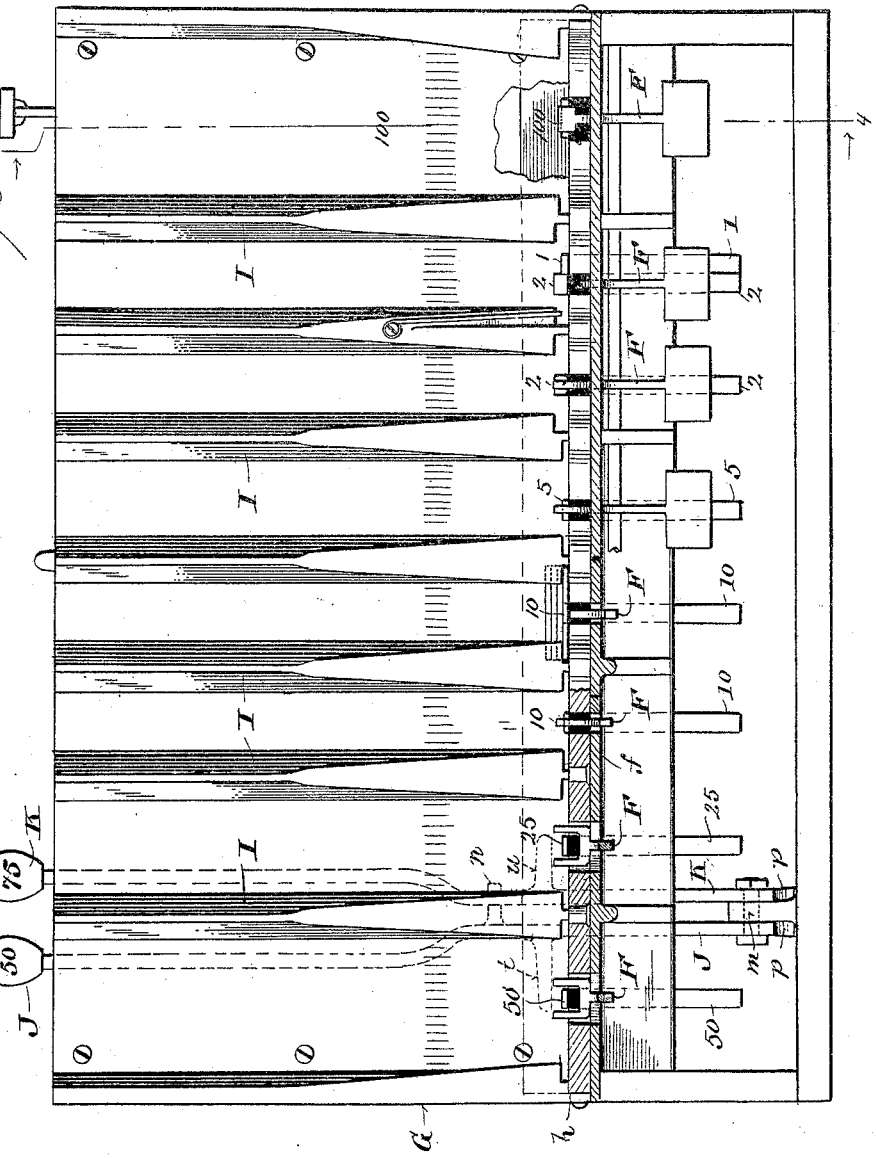

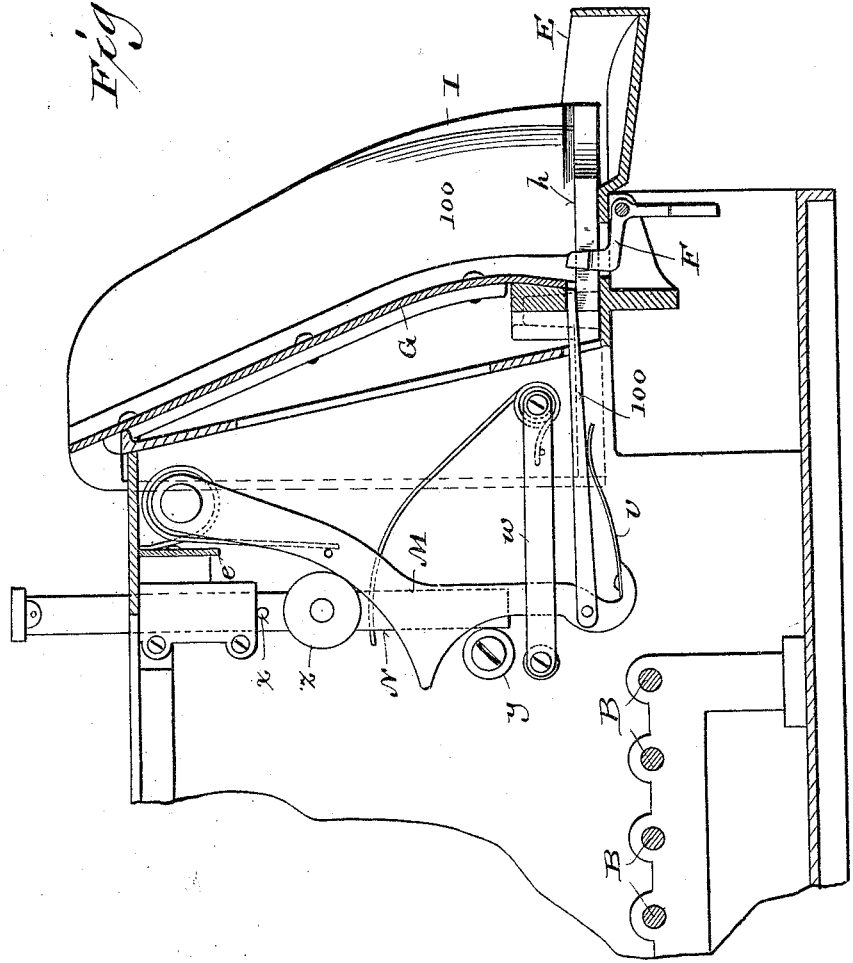

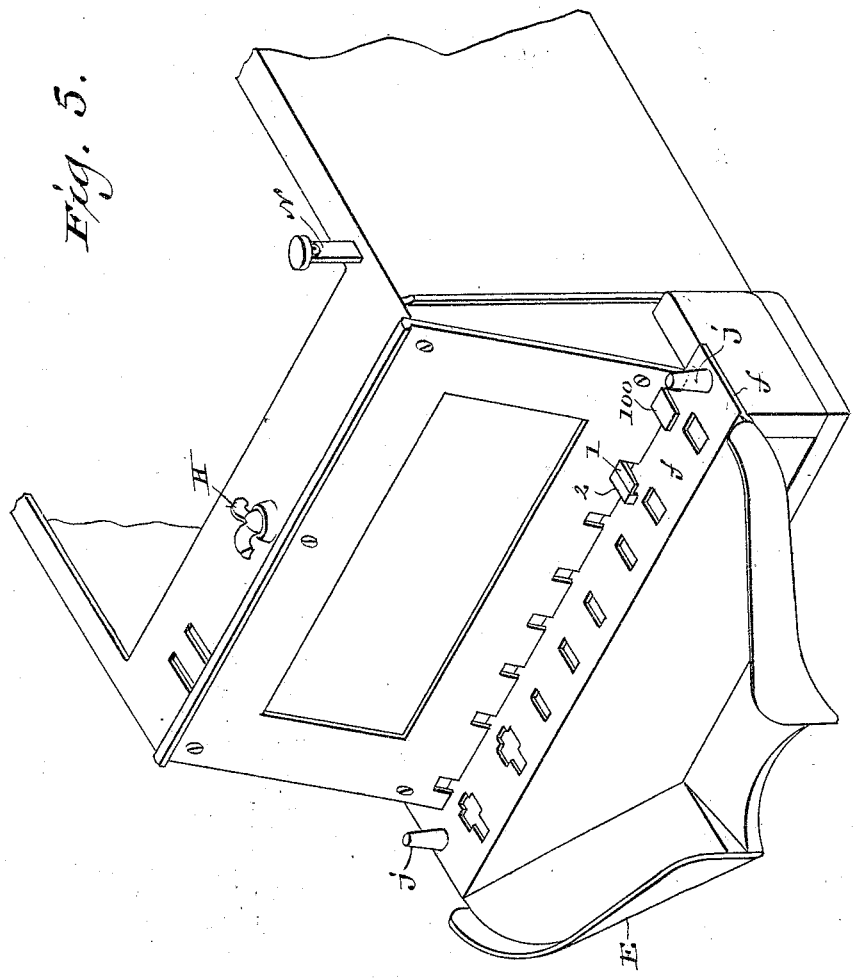

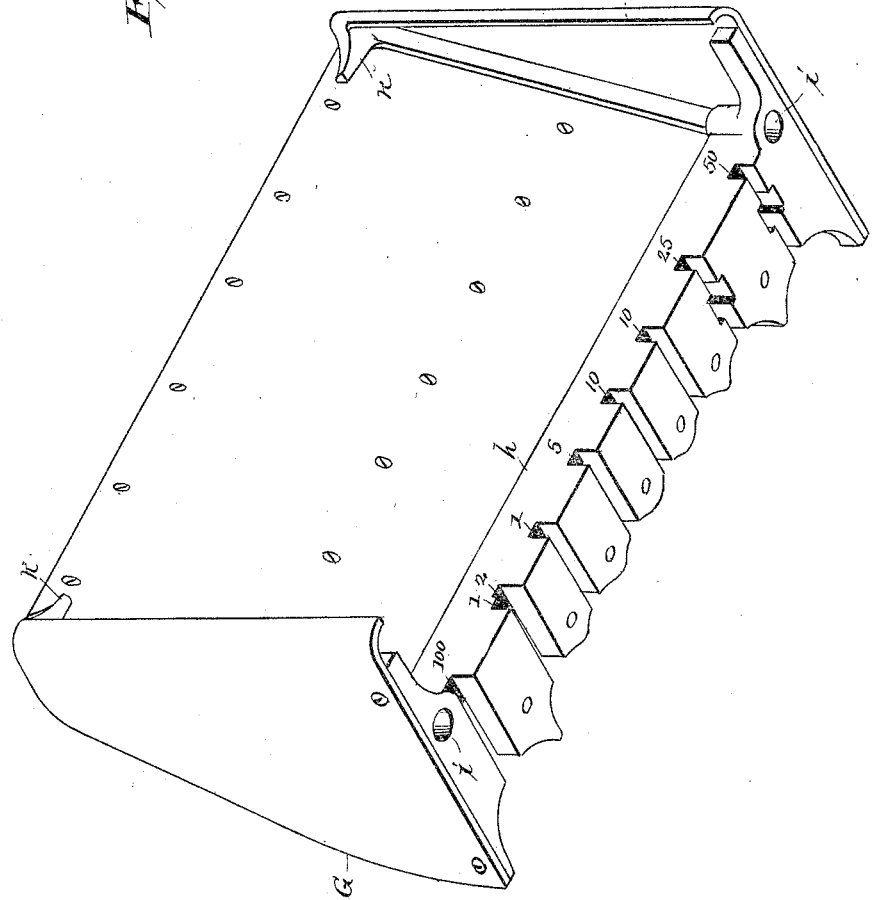

UNITED STATES PATENT OFFICE.

EDWARD J. BRANDT, OF WATERTOWN, WISCONSIN, ASSIGNOR TO THE EDWARD J. BRANDT-DENT COMPANY, OF WATERTOWN, WISCONSIN.

COIN-DELIVERY MACHINE.

No. 923,013.      Specification of Letters Patent.      Patented May 25, 1909.

Application filed March 26, 1904. Serial No. 200,124.

*To all whom it may concern:*

Be it known that I, EDWARD J. BRANDT, a citizen of the United States, and resident of Watertown, in the county of Jefferson and State of Wisconsin, have invented certain new and useful Improvements in Coin-Delivery Machines; and I do hereby declare that the following is a full, clear, and exact description thereof.

My invention has for its object to provide simple, economical and compact coin-delivery machines analogous in some of their features to those disclosed in my Patent 658828, of October 2, 1902, and others noted therein; said invention consisting in certain peculiarities of construction and combination of parts hereinafter particularly set forth with reference to the accompanying drawings and subsequently claimed.

Figure 1:
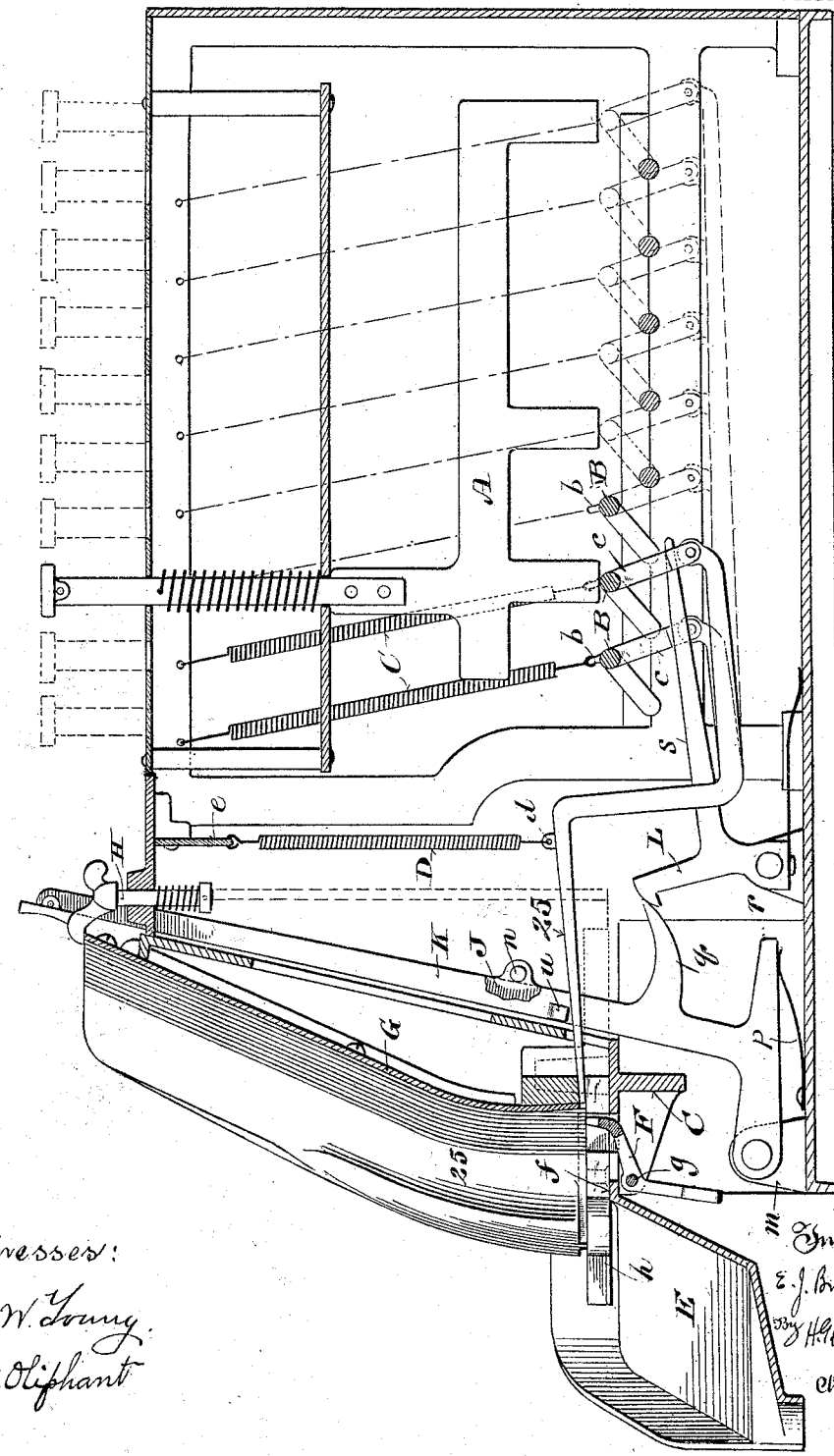
Figure 2:
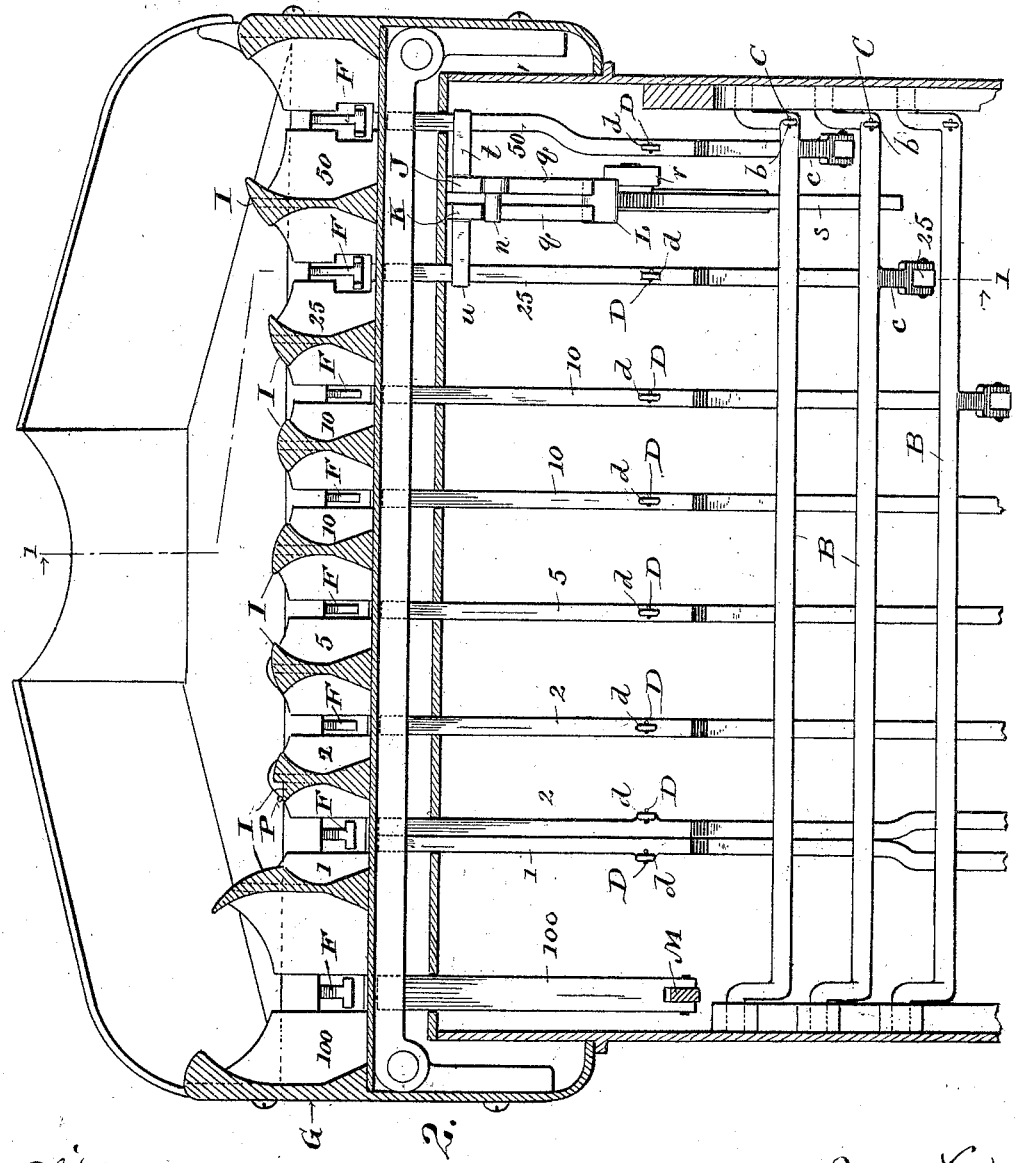

Figure 1 of the drawings represents a vertical longitudinal section view of my improved coin-delivery machine, this view being indicated by line 1—1 in the second figure of the series, Fig. 2, a horizontal section view of a fragment of the machine; Fig. 3, a front elevation of the machine partly in vertical transverse section. Fig. 4, a vertical longitudinal section of a fragment of the machine, this view being indicated by line 4—4 in the third figure of the series; Fig. 5, a perspective view of a fragment of the machine, and Fig. 6, a similar view of a detachable coin-tray element of the machine seen from the rear looking upward.

In Fig. 1, of the drawings, A indicates one of the series of vertically reciprocative edgewise plates common in the class of machines to which my improvements relate, each of the same being in connection with a suitably guided spring-controlled push-pin accessible above the top of a casing inclosing said plates and other elements of the machine in which they are assembled. Each plate is provided with a foot or feet and each foot rests on one of a series of rockers B that are also common in the art. The present machine is designed to have the plates aforesaid longitudinally thereof, and the rockers are cranked at both ends and journaled in the sides of the casing portion of said machine. Suspended in the casing is a series of spiral-springs C, and the lower end of each spring is connected to an ear $b$ of a rocker, there being as many springs as there are rockers. Each rocker is provided with an arm $c$ that constitutes a supplemental crank and pivotally connected to the arm is the lower horizontal rear portion of an angular coin-pusher, the upper horizontal forward portion of which has an ear $d$ in connection with the lower end of one of a series of spiral-springs D suspended from a transverse bar $e$ within the casing aforesaid.

The front of the machine-casing has upward and rearward inclination above a horizontal rear upper flange $f$ of a chute E made fast on a forward frame-extension of said casing. The chute has pitch forward of its flange $f$, and is also pitched from the sides of the machine toward the front at an angle obtuse to that of the pitch from said flange, the exposed central front edge of said chute being preferably concave to facilitate the delivery of coins.

Loose on a rod $g$ arranged in the forward frame portion of the machine-casing is a series of bell-cranks F, one arm of each of which is weighted and its other arm extended up through registering slots provided in the chute-flange $f$ and the bottom $h$ of a coin-tray G, this tray being hereinafter more fully described. The slots are alined with vertically disposed lower notches in the inclined casing-front immediately above the chute flange $f$, and the upper horizontal portions of the coin-pushers 50, 25, 10, 5, 2, 1, and 100, have their play in said notches, each bell-crank serving at times as a stop in the path of the corresponding coin-pusher to prevent thrust of same.

The bottom $h$ of the coin-tray is made with sockets $i$ that engage dowel-pins $j$ extending upward from the front frame-extension of the aforesaid casing through the chute-flange $f$ thereon, and the construction of said tray is such that it will stand alone, with its contents, when detached from said casing. The tray has sliding engagement with the front corners of the casing, its upper rear webs $k$ coming over the top of said casing to improve the finish of the machine. The casing is shown provided with a pivotal spring-controlled latch H that catches on the upper edges of the back of the coin-tray central of the same. To form the coin-compartments of the tray, its back is provided with a series of front ribs I parallel to its ends at suitable intervals apart, and while said compartments are for the most part rearwardly inclined in an upward direction, they are approximately vertical at their lower ends over the tray-bottom. Hence the column of coin immediately adjacent to said tray-bottom is vertical, the remainder of the column being at an acute angle to the vertical portion thereof, the result being a reduction of pressure from above on the coin nearest the point of discharge. The extreme lower portion of the tray-back is bent rearward to afford clearance for bottom coin in the compartments, and the sides of each compartment are made to conform to the curvature of the coin placed therein.

The lower portions of the front edges of the ends and ribs of the tray are tapering for a suitable distance as best shown in Fig. 3, whereby the front openings of the several coin-compartments of said tray between its ends and the adjacent ribs I, and between others of the ribs I, are gradually contracted in a downward direction, the contraction beginning high enough to prevent the inclined upper portions of the coin-columns from working forward on the lower vertical portions of same. Immediately above the tray-bottom, space is provided in each compartment for the expulsion of coin into the chute above specified.

The coin in the compartments of the tray depress the bell-cranks out of the paths of the coin-pushers that are horizontally reciprocative, and these pushers are depressed in the front notches of the casing and accurately centered in the bottom slots of said tray. The coin in a tray-compartment being exhausted, the corresponding bell-crank tilts up in the path of the relative coin-pusher, and the same result occurs should a coin become lodged in said compartment above said pusher. Hence it is impossible for any of the coin-pushers to have forward thrust unless there is free coin ahead of same.

As thus far described the machine is schemed to pay coin in sums of one cent to one dollar of United States money. There are tray-compartments for fifty, twenty-five, ten, five, one and one hundred cent coin, and they are indicated by the numerals 50, 25, 10, 5, 1 and 100, similar to certain of the coin-pushers above specified. All but two of the coin-pushers operate to each eject one coin at a time, but the remainder are thick enough at their forward ends to eject two coins on forward thrust, clearance space necessary to this result being provided.

Pushers 1 and 2 operate to eject coin from one of the one cent compartments of the tray, and to prevent more than one coin being ejected when the first of said pushers has forward thrust a spring-wire P is arranged in connection with one of the ribs I to play in a recess of same and normally serve as a detent for the second coin above the bottom of the tray. This detent yields to pressure and automatically clears the coin back of same when the corresponding pusher 2 is thrust forward. In case only one coin remains in the tray-compartment from which one or two coin can be ejected, the weighted portion of the relative automatic-stop F is sufficient to overcome that of the single coin and lift the latter high enough to permit said stop to come in the path of both of the adjacent pushers thus preventing forward thrust of either. As shown by the short vertical parallel lines in Fig. 3, a distinctive coloring may be employed at the back of the lower portion of the tray-compartments as a visible signal that coin in said compartments is becoming exhausted.

The coin-compartments in the tray are filled from above the contractions of their front openings, and said tray and its contents can be readily removed from the machine to a safe or vault. To facilitate removal of the tray the same is made to project at its ends beyond the sides of the casing with which it has sliding engagement, thus affording grasp for the hands of the operator.

Like in the patents aforesaid, provision is had for preventing discharge of twenty-five and fifty cent coin in various combinations, when change out of twenty-five, fifty or seventy-five cents is wanted from the machine, and in matters of detail, the mechanism herein described for accomplishing the desired result constitutes a feature of the present invention. Fulcrumed in connection with a lug $m$ on the bottom of the casing aforesaid are levers J, K, that extend up through slots in the top of said casing longitudinally thereof, and a lug $n$ of one of these levers is in the rearward path of the other. Each of the levers J, K, is supported on a flat-spring $p$, by which it is held in normal position and returned thereto subsequent to an operation hereinafter described. An arm $q$ of each lever is normally at rest on the head of a spring-controlled latch L pivotally connected to a lug $r$ of the casing-bottom, and this latch is provided with a tail $s$ that extends rearward under the rockers that actuate the coin-pushers 50 and 25. The lever J is provided with a lateral lug $t$ that extends over the coin-pusher 50, and the lever K is provided with a similar lug $u$ that extends over the coin-pusher 25. If the lever J be pushed backward, its lug $t$ will depress the coin-pusher 50 below the coin in the compartment 50 of the tray, and its arm will be caught by the latch L, the release and automatic return of said lever to normal position occurring when the rocker in connection with the pusher 50 subsequently operates on the tail of said latch. If the lever K be pushed backward it operates on the lug $n$ of lever J and the result is a simultaneous depression of the coin-pushers 25 and 50 to clear the coin in the corresponding tray-compartments, both levers being caught by the latch L and subsequently released when the tail of said latch is operated upon by either or both of the rockers that actuate said pushers. In order not to interfere with the forward movement of the pushers 25 and 50 when the same are depressed to clear the coin in the corresponding tray-compartments, the bell-crank stops for said pushers are notched at their upper ends to afford the necessary clearance, but there being no coin in either of said compartments, the relative pusher-stop automatically tilts upward and a solid portion of the same is then in the path of the corresponding pusher.

The 100 or dollar coin pusher is supported on a spring $v$ herein shown made fast to a lower-end offset of a spring-controlled lever M suspended on a pivot in the casing of the machine, and said pusher is pivotally connected to the lever. A guard-bar $w$, connected to lateral studs in the casing, opposes one side of the lever M, and the other side of this lever is opposed by a spring-controlled plunger N guided in said casing, its upward movement being limited by a stop $x$ therewith that comes in contact with the guide. An edge of the plunger works against an anti-friction roller $y$ arranged in the casing, and a similar roller $z$ carried by said plunger rides on a curved edge of the adjacent lever. Depression of the plunger N, against spring resistance, actuates the pusher 100, if the stop for same be out of its path. Pressure being removed from the plunger, there is automatic return of the pusher 100, the lever M in connection therewith and said plunger to normal position.

The coin ejected from the tray fall flat into the delivery-chute and slide into a hand of the operator or onto paper held by him under the mouth of said chute. Provision being had for depressing the lower projecting forward ends of the coin-pushers, when the coin-tray is accurately fitted on the casing, the proper registration of said pushers with the coin will not be affected should said tray fail to come down snug on its support, as may sometimes happen, because of interposed material such as dirt particles or accumulations of dust.

Having thus described my invention, what I claim as new, and desire to secure by Letters-Patent, is:—

1. The combination of a casing having its front provided with lower notches, rockers journaled in the casing transversely of same, rocker-actuating push-plates in said casing longitudinally of same, springs hung in the aforesaid casing and connected at their lower ends to the rockers, a crank-arm extending from each rocker, and a longitudinally movable coin-pusher in pivotal connection with each crank-arm, a portion of the pusher being in engagement with one of the notches aforesaid in which it is guided.

2. The combination of a casing, rockers journaled at their ends in the casing transversely of same, rocker-actuating push-plates in said casing longitudinally of same, springs hung in the aforesaid casing and connected at their lower ends to the rockers, a crank-arm extending from each rocker, a longitudinally movable one-piece angular coin-pusher in pivotal connection with each crank-arm, and other springs hung in the casing in connection at their lower ends with the coin-pushers.

3. The combination of a casing having its front provided with lower notches, rockers journaled in the casing transversely of the same, rocker-actuating push-plates in said casing longitudinally of same, springs hung in the aforesaid casing and connected at their lower ends to the rockers, a crank-arm extending from each rocker, a longitudinally movable coin-pusher in pivotal connection with each crank-arm, a portion of the pusher being in engagement with one of the notches aforesaid in which it is guided, and other springs hung in said casing in connection at their lower ends with the coin-pushers.

4. The combination of a casing, rockers journaled in side portions of the casing, spiral-springs suspended in the casing and attached at their lower ends to the rockers, horizontally reciprocative coin-pushers coupled to said rockers, other spiral-springs suspended within said casing and connected at their lower ends with the coin-pushers, and means for actuating said rockers against spring-resistance.

5. The combination of a casing, spring-controlled rockers journaled in side portions of the casing, horizontally reciprocative coin-pushers coupled to the rockers, swing-stops arranged to be depressed out of the paths of said pushers by opposing coin, and means for actuating said rockers against spring-resistance.

6. The combination of the coin-pushers, means for actuating the same, the pivot-rod, and the series of bell-cranks hung on said rod to have an arm of each held by coin out of the path of a coin-pusher.

7. The combination of a casing, rockers having end cranks journaled in sides of the casing, an arm extending from each crank to constitute a supplementary crank of same, spiral-springs suspended in said casing and attached at their lower ends to the rockers, horizontally reciprocative coin-pushers coupled to the supplementary cranks of the rockers, means for actuating the rockers against spring-resistance, and tilt-stops arranged to normally resist forward movement of said pushers.

8. The combination of spring-suspended coin-pushers, the rockers coupled to said pushers, a spring-controlled lever provided with a lug overlying the forward horizontal portion of one of the pushers, a spring-controlled pivotal latch engageable with an arm of the lever, and a tail extending from the latch in the path of the rocker for the pusher under said lever-lug.

9. The combination of spring-suspended coin-pushers, the rockers coupled to said pushers, a pair of spring-controlled levers one of which is independently adjustable and the other adjustable with the one aforesaid, a lug extended from each lever to overlie a coin-pusher, a spring-controlled pivotal latch engageable with arms of the levers, and a tail extending from the latch in the path of rockers for the pushers under the lever-lugs.

10. The combination of a casing having its front provided with lower notches, rockers journaled in the casing transversely of same, rocker-actuating push-plates in said casing longitudinally of same, springs hung in the aforesaid casing and connected at their lower ends to the rockers, a crank-arm extending from each rocker, and a longitudinally movable one-piece angular coin-pusher in pivotal connection with each crank-arm, an upper horizontal portion of the pusher being in engagement with one of the notches aforesaid in which it is guided.

11. The combination of a casing having its front provided with lower vertical notches, rockers journaled in side portions of the casing, spiral-springs suspended in the casing and attached at their lower ends to the rockers, horizontally reciprocative coin-pushers guided in said notches and coupled to said rockers, other spiral-springs suspended in said casing and attached at their lower ends to said pushers, and means for actuating the coupled rockers and pushers against spring-resistance.

12. The coin-tray having vertically disposed compartments that are open at the front and these openings gradually contracted in a downward direction from a predetermined distance above their lower ends, the bottoms of each compartment being horizontal, the lower portion of its back rearwardly bent and the remainder of said back inclined rearward above the bend.

13. The combination of the delivery-chute having a rear upper horizontal flange provided with slots, the coin-tray having bottom slots that register with those aforesaid, the coin-pushers guided in the tray-slots, and the automatic swing-stops that extend through the chute-flange slots to normally oppose forward thrust of said pushers.

14. The combination of a spring-controlled lever, a coin-pusher in pivotal connection with the lever, a supporting spring for the pusher connected at one end to said lever, and a spring-controlled plunger provided with an anti-friction roller opposing a curved edge of the aforesaid lever.

15. The combination of a spring-controlled lever, a coin-pusher in pivotal connection with the lever, a supporting spring for the pusher connected at one end to said lever, a spring-controlled plunger provided with an anti-friction roller opposing a curved edge of the aforesaid lever, and another anti-friction roller arranged to oppose an edge of the plunger.

16. The combination of a casing having its front provided with vertical notches, spring-controlled rockers journaled in side portions of the casing, horizontally reciprocative coin-pushers guided in said notches and coupled to the rockers, spiral-springs in said casing attached at their lower ends to the coin-pushers, a coin-tray having bottom slots in which the forward ends of said coin-pushers are depressed, and means for actuating said rockers against spring resistance.

In testimony that I claim the foregoing I have hereunto set my hand at Milwaukee in the county of Milwaukee and State of Wisconsin in the presence of two witnesses.

EDWARD J. BRANDT.

Witnesses:
N. E. OLIPHANT,
R. J. BARSCH.